(12) United States Patent
Bolliou

(10) Patent No.: US 9,585,492 B2
(45) Date of Patent: Mar. 7, 2017

(54) FUNCTIONALIZED LATEX BASED FOAM

(75) Inventor: Alexander Bolliou, Tielt (BE)

(73) Assignee: Latexco NV, Tielt (BE)

( * ) Notice: Subject to any disclaimer, the term of this patent is extended or adjusted under 35 U.S.C. 154(b) by 0 days.

(21) Appl. No.: 13/821,112

(22) PCT Filed: Sep. 7, 2011

(86) PCT No.: PCT/EP2011/065466
§ 371 (c)(1),
(2), (4) Date: May 14, 2013

(87) PCT Pub. No.: WO2012/032081
PCT Pub. Date: Mar. 15, 2012

(65) Prior Publication Data
US 2013/0224458 A1  Aug. 29, 2013

(30) Foreign Application Priority Data

Sep. 7, 2010 (EP) .................................. 10009299

(51) Int. Cl.
| | |
|---|---|
| *A47C 27/15* | (2006.01) |
| *A47C 31/00* | (2006.01) |
| *B29C 44/22* | (2006.01) |
| *C08J 9/28* | (2006.01) |
| *C08J 9/40* | (2006.01) |

(Continued)

(52) U.S. Cl.
CPC ............ *A47C 27/15* (2013.01); *A47C 31/001* (2013.01); *B29C 44/22* (2013.01); *C08J 9/28* (2013.01); *C08J 9/40* (2013.01); *B29K 2021/00* (2013.01); *B29K 2105/04* (2013.01); *B29L 2031/751* (2013.01); *C08J 2201/0504* (2013.01); *C08J 2205/05* (2013.01); *C08J 2207/00* (2013.01); *C08J 2307/02* (2013.01); *C08J 2309/04* (2013.01); *C08J 2309/06* (2013.01); *C08J 2309/10* (2013.01); *C08J 2311/02* (2013.01); *C08J 2313/02* (2013.01); *C08J 2319/02* (2013.01); *Y10T 428/24967* (2015.01);

(Continued)

(58) Field of Classification Search
None
See application file for complete search history.

(56) References Cited

U.S. PATENT DOCUMENTS

| | | | | |
|---|---|---|---|---|
| 4,288,559 A | * | 9/1981 | Illger et al. | ...................... 521/55 |
| 4,342,798 A | * | 8/1982 | Illger et al. | ................... 427/244 |

(Continued)

FOREIGN PATENT DOCUMENTS

| | | |
|---|---|---|
| EP | 0 184 466 | 6/1986 |
| EP | 1 842 649 | 10/2007 |

(Continued)

OTHER PUBLICATIONS

Bradley, C. E., "Vulcanization of Latex". Industrialy and Engineering Chemistry, Dec. 1939; vol. 21, No. 12, pp. 1485-1488. <http://pubs.acs.org/doi/pdf/10.1021/ie50360a012>.*

*Primary Examiner* — David Sample
*Assistant Examiner* — Donald M Flores, Jr.
(74) *Attorney, Agent, or Firm* — Levy & Grandinetti

(57) ABSTRACT

An integral latex foam having a first layer foam and a second and/or subsequent layer of latex foam is disclosed. The first layer foam contains an additive that is applied in the form of a solution, emulsion or dispersion. The first layer has a thickness from 0.01 to 9 mm.

15 Claims, 1 Drawing Sheet

Figure 1A:
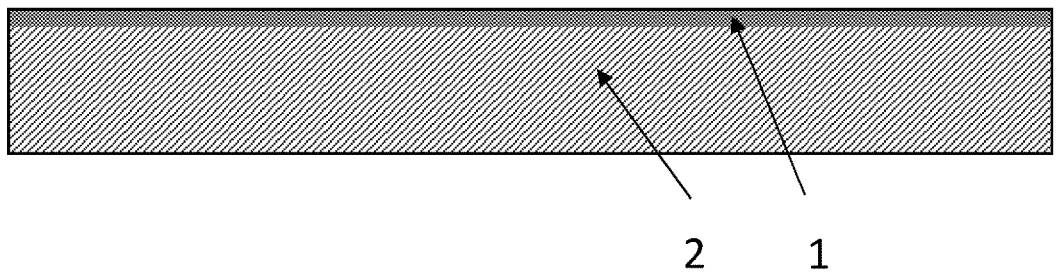

(51) Int. Cl.
 *B29K 21/00* (2006.01)
 *B29K 105/04* (2006.01)
 *B29L 31/00* (2006.01)

(52) U.S. Cl.
 CPC ............... *Y10T 428/249954* (2015.04); *Y10T 428/249981* (2015.04)

(56) References Cited

U.S. PATENT DOCUMENTS

| | | |
|---|---|---|
| 6,750,271 B2 | 6/2004 | Nanbu et al. |
| 7,793,372 B2 | 9/2010 | Lean et al. |
| 2008/0313815 A1 | 12/2008 | Guesquierre |
| 2012/0276339 A1* | 11/2012 | Pearce et al. ................ 428/160 |

FOREIGN PATENT DOCUMENTS

| | | |
|---|---|---|
| EP | 1 878 553 | 1/2008 |
| WO | WO 01/06054 | 1/2001 |
| WO | WO 01/62376 | 8/2001 |
| WO | WO 2006/013165 | 2/2006 |
| WO | WO 2006/011702 | 11/2006 |

* cited by examiner 2  1

2  1a  1b 2  1a  1b

FUNCTIONALIZED LATEX BASED FOAM

This Application is the U.S. National Phase of International Application Number PCT/EP2011/065466 filed on Sep. 7, 2011, which claims priority to European Application Number 10009299.8 filed on Sep. 7, 2010.

TECHNICAL FIELD

The present invention relates to latex based foams, more in particular, the present invention relates to functionalized latex foams for use in bedding or seating product, in which the foam is impregnated with one or more of additive.

The present invention also provides a method for the preparation of latex foam including the step of impregnating the surface of said latex foam with an additive in which the additive is applied in the form of a solution, emulsion or dispersion and the impregnation is achieved by a spraying technique.

BACKGROUND OF THE INVENTION

The marketplace is replete with foamed products that attempt to provide comfort to support structures. For example, mattress and pillow toppers are often used to provide additional comfort and to extend the useful life of a mattress or pillow. Such toppers are disposed at the top surface of the mattress or pillow, and may consist of foam thinner than the mattress and coextensive with the length and width of the mattress or pillow. The thickness of the topper can be selected based on the amount of support and cushioning desired by a user. The topper provides additional cushioning on the mattress or pillow, and protects the mattress or pillow from soiling.

A variety of additives are known to be added to said foamed products. Such functional agents are generally applied in an attempt to provide essentially new functionalities to the final foamed product. While such agents can be beneficial, in certain applications it can also result in undesirable effects with respect to the original properties of the foam product.

An example of such additive are phase change materials (PCM). Depending on the material of construction, many mattresses and pillows have poor heat dissipation, which is uncomfortable for the user when sleeping. As a result, some support structures include ventilation holes, extra layers of material, adjustable air bladders and the like, to attempt to improve heat dissipation.

While it is desirable to provide foam products having good thermal properties, it has been difficult to achieve efficient thermal properties while maintaining the basic original properties of the foam.

US 2009/0288259 describes a latex foam which reflects to an appropriate degree the, sometimes conflicting, requirements set. In addition, the heat regulation of the known foam is still not entirely satisfactory since the heat regulation of the foam, as has been found, is achieved at the cost of the heat regulation or of the properties of the foam, such as the uniformity of the foam cell structure.

The object of the present invention is at least partially to overcome at least one of the above-mentioned drawbacks, or else to provide a usable alternative.

According to the process of the present invention, it has now been surprisingly found that, in case the foamed product is latex foam, the efficiency and activity of the functionalized particles themselves are maintained and the foam properties such as air/moisture regulation and breathability are not adversely affected. Said foams also have been found to provide improved efficiency of the functional active agent.

The present invention relates to foams onto which additive are sprayed. The foams are characterized by having the active functional agents present by a particular particle size, particle spacing and coverage value within a specific top layer of the foam.

According to the present invention, there are a number of advantages associated with foam products containing functional particles only on the surface of the product which will be contacted by the user, and as opposed to particles throughout the entire structure of the foam.

Beyond the economic advantages associated with the use of less particles, there are also advantages associated with foams containing a functionalized particles in which the particle is not present in the foaming mixture during production of the foam, and is instead added during a post-foaming step. The presence of the particles in the foaming mixture may influence the foaming process, and requires adjustments to the various parameters used during foaming.

Accordingly, it is also a further object to provide functionalized latex foam with little or no adjustments to the conventional foaming production steps.

It is a further object of the invention to provide a thin functionalized mattress of the type to be used as a topper for a conventional mattress. More specifically, it is an object of the invention to provide a functionalized topper on the order of 2 to 20 cm thick that has the area of a conventional mattress. This topper mattress is placed over a conventional mattress and is used to provide the comfort of latex foam without the expensive of replacing the conventional mattress providing the benefits as stated hereinabove.

The topper of the present invention is for use on top of an existing conventional mattress, to increase the comfort of the mattress while utilizing an existing conventional mattress. The topper can be used as an after market product and placed on top of a mattress.

Toppers for use in bedding or seating products are known. These toppers extend across the entire width and length of the particular bedding or seating product. If the particular bedding or seating product is a mattress, typically one such topper is placed on one side of the mattress, and a second topper is placed on the opposite side of the mattress thereby effectively "sandwiching" the mattress. This combination then typically is covered with an upholstered fabric covering.

Toppers have been designed so as to provide multiple degrees of stiffness or firmness. In particular, in a bedding structure, which includes an innerspring mattress and a topper, the topper includes foam which is glued or poured.

Alternatively, the topper in accordance with the present invention can be placed on an unfinished mattress (either a conventional mattress including steel springs or a foam mattress) and the topper and the mattress is then covered with fabric.

These and other preferred aspects of the invention are described in more detail below and will be better appreciated from the detailed description including the FIGURE.

DETAILED DESCRIPTION OF THE INVENTION

The present invention relates to the following embodiments:

An integral latex loam comprising a first layer of latex foam and a second and/or subsequent layer of latex foam characterized in that said first layer contains an additive that is applied in the form of a solution, emulsion or dispersion and whereby the first layer has a thickness from 0.01 to 9 mm.

The integral latex foam, wherein the latex foam is impregnated with said additive.

The integral latex foam, wherein the core of said foam is substantially free of said additive. The core is herein defined as the part of the integral foam structure at a distance of 9 mm of the outer surface of said foam structure when measured perpendicularly to the outer surface.

The integral latex foam, comprising a third layer containing with an additive in which the additive is applied in the form of a solution, emulsion or dispersion and whereby the third layer has a thickness from 0.01 to 9 mm.

The integral latex foam, wherein said additive being selected from wherein the additive is selected from the group consisting of i) phase change material, ii) fire retardant, iii) an antimicrobial active agent, iv) an antifungal agent, and combinations comprising at least one of the foregoing.

The integral latex foam, wherein the additive is a phase change material.

The integral latex foam, wherein said first layer and/or third layer is colored.

The integral latex foam, wherein the application is achieved by a spraying technique.

A bedding product comprising a latex foam according to the present invention.

The bedding product, wherein said product is a mattress topper.

The mattress topper, wherein said topper has a thickness of from 2 to 20 cm.

A process for manufacturing an integral latex foam according to the present invention, the process comprising the steps of:
a. pouring latex foam;
b. vulcanizing the poured latex foam;
c. dosing an additive to the vulcanized latex foam in which the additive is dosed in the form of a solution, emulsion or dispersion.

The process for manufacturing an integral latex foam according to the present invention, wherein the dosing is achieved by a spraying technique.

A kit in parts of a latex foam and an application kit comprising a solution, emulsion or dispersion of an additive to be applied on a surface of the foam layer.

The kit in parts, wherein said additive being selected from wherein the additive is selected from the group consisting of i) phase change material, ii) fire retardant, iii) an antimicrobial active agent, iv) an antifungal agent, v) a perfume and combinations comprising at least one of the foregoing.

Latex Foam:

"Latex" is herein defined as a dispersion of polymeric particles in a continuous phase, the polymeric particles preferably having a size range of from 10 to 1000 nm. The latex foam material can be prepared from natural rubber latex or from one or more of such synthetic latexes as polybutadiene/styrene latex, polybutadiene/acrylonitrile latex, polychloroprene latex and the like or from a mixture of natural rubber latex and one or more such synthetic latexes. The latex foam includes conventional latex foam as well as visco-elastic latex foam.

The solids content of suitable aqueous latexes is from 20 to 75% by weight. Preferred latexes have a solid content of from 50 to 75% by weight.

Suitable polymer latexes are all dispersions in which the solid is dispersed in a liquid phase and this phase in turn forms an emulsion with a further liquid phase. Examples are latexes of polymers consisting of dienes or olefinically unsaturated monomers and copolymers thereof, such as polystyrene-butadiene latex, polybutadiene latex, polyisoprene latex, natural rubber latex, acrylonitrile-butadiene latex, polychloroprene latex, polydichlorbutadiene latex, latex of a copolymer of chloroprene and dichlorobutadiene, polyisoprene latex, latex of chlorinated polyisoprene or (meth)acrylate latex. Dispersions of polyurethanes or other dispersions in which polymers are dispersed in water with the aid of emulsifiers or dispersing agents are also suitable, however.

Preferred latexes include latexes of natural rubber, styrene-butadiene rubber (SBR), SBR having low styrene content (up to 27%), nitrile rubber (NBR), isoprene rubber, neoprene rubber, polybutadiene rubber, isobutylene-isoprene rubber (IIR), copolymers of acrylonitrile, methacrylonitrile, acrylates, methacrylates, vinylpyridine with butadiene or 2-chloro-1,3-butadiene and chlorinated polyethylene or mixtures of any of these.

Highly preferred are latexes of natural rubber, styrene-butadiene rubber, nitrile rubber, polybutadiene rubber, isoprene rubber or copolymers comprising acrylates.

Polymer-containing latexes, such as e.g. SBR (styrene-butadiene rubber) or NBR (acrylonitrile-butadiene rubber), polychloroprene, polybutadiene, polyisoprene, natural rubber latex, polyvinyl chloride, (meth)acrylate dispersions or dispersions of copolymers thereof, are conventionally available commercially in solids concentrations of more than 50%. These concentrations can be achieved e.g. by increasing the concentration of low-concentration polymer latexes. The concentration of natural rubber latex is increased from 30% to 60% solids, for example.

Other preferred latexes are combinations of synthetic and natural latex. Preferred proportions of natural latex to synthetic latex can be varied from 1:4 to 6:4. Highly preferred proportions of natural to synthetic latex are more than 1:1.

The proportions should be optimized according to the latex used.

Methods of obtaining latex foam can be those where latex being poured into a closed mould provided with aluminium pins to ensure good heat conduction, and subsequently being vulcanised, washed and dried into an end product. As a result of the presence of the aluminium pins in the closed mould, the mattress comprises vertical, continuous recesses that ensure a proper ventilation of the mattress. According to this method, mattresses having a thickness of up to 20 cm can be produced, with the thickness mainly being limited by the speed at which the heat can be introduced into the core of the latex material. An alternative method for producing latex foam is the pouring of latex foam on an endless conveyor belt, followed by vulcanisation, washing and finally drying. The maximum height of the mattress built up of latex foam is approximately 6 cm, because heat cannot be introduced into the core of the latex material sufficiently quickly due to the absence of aluminium pins on the conveyor belt. Thus, owing to the absence of the aluminium pins on the conveyor belt, the latex plate that is obtained does not have any vertical, continuous channels.

The present invention relates to latex based foams, more in particular, the present invention relates to functionalized latex foams for use in a bedding or seating product, in which the foam is impregnated with one or more of additive By "integral" is meant that the latex foam is a single continuous foam product with a continuous foam structure.

Additive Material:

A characteristic feature of the invention is the fact that the surface of the latex foam is impregnated with additive Preferably the foam has the additives agents in the form of particles. In particular, the surface containing layer 1 is covered with particles in a plane in longitudinal cross section, for at least 1% of the surface. Preferably, the additive containing layer comprises at least 0.001 g/m$^2$ of particle, but more preferably 0.1 to 1000 g/m$^2$, most preferably 50-450 m$^2$.

Preferably, the additive-containing layer has a thickness of 0.01-9 mm. As a result of the proposed thickness and amount of particulate, the latex foam material according to the invention is eminently suitable for the heat and air/moisture regulation that is necessary. In normal use of the latex foam, the foam experiences a specific development of heat and mechanical loading. The thickness found and the provision of the additive can provide the foam with desired flexibility, restoring capacity and breathe ability and heat regulation and thus meet a number of requirements which are contradictory from the point of view of material.

For purposes of economy and effectiveness, it has been found advantageous to include functionalized particles, when used, in the surface layer 1. Because the surface layer 1 is relatively thin in comparison to remaining layer of the foam 2, disposing such agents in the layer 1 allows the use of reduced total amounts of the particles to achieve similar effective concentrations in comparison to thicker layers, thereby reducing costs associated with the particles. Also, disposing such particles in the surface layer 1 ensures that the agents are disposed in the outermost layer of the foam i.e., the body contacting regions, rather than in regions remote from the user, which can increase the effectiveness of the particles.

Suitable functional additive classes include: i) phase change materials ii) pigments iii) antibacterial and antifungal agents iv) skin-conditioning agents (e.g., humectants, including miscellaneous and occlusive), other skin-feel agents, moisturizers, skin repair ingredients including agents for preventing, retarding, and/or reversing skin lines, wrinkles, or atrophy, skin soothing and/or healing agents v) perfumes vi) flame retardants and mixtures thereof.

A particular class of functionalized additive includes a phase change material (PCM).

An example of a PCM is paraffin. In the case of a supply or discharge of energy in the range of the melting point of the PCM, the material maintains its melting temperature during the phase transition from a solid to a liquid state or vice versa. Only after the course of the phase transition will the temperature continue to rise or else fall. This effect is used to regulate the temperature of the material wherein the PCM is added. This allows the temperature of within the surface of the latex foam to be kept at a constant temperature. When a foam product, such as mattress or topper, is made according to the present invention, it is advantageously possible to ensure efficient heat management of the foam. It is thus possible to prevent the foam from becoming too warm, but also to prevent the foam from providing insufficient insulation. One possible phase changing material can comprise phase changing microspheres (available under the product name Outlast), which contain materials that can change phases at near body temperature. As a result, heat energy can be stored in the barrier layer, resulting in a product that can feel cool or warm.

Preferably, the PCM-containing layer comprises a crystallizable organic substance as the PCM. This may for example be an n-paraffin having a melting point of between −10° C. and 65° C. (n-docadene to n-octacosane). The paraffin can have a form bound in a porous structure, but can also be applied in a micro-encapsulated form in a polymer dispersion. The polymer can for example form part of the group of acrylates, polyurethanes, styrene-butadiene latexes, silicones or mixtures of polymers of this type.

In a preferred embodiment of the foamed product according to the invention, the PCM is applied in the form of microspheres.

In particular, the substrate layer 1 is made of latex foam having a thickness of 2-20 cm, provided with 50-450 g/m$^2$ of PCM.

Preferred PCM materials include those exemplified in WO 01/06054; WO 01/62376; US 2002/055560 and WO 2006/013165. Highly preferred PCM's are those described in WO 2006/117702.

Examples of commercially available PCM's include Mikrathermic G Soft; Micracat B; Micra EF and Micrafix (from DEVAN Chemicals).

According to another class of additive, the additive containing layer can also comprise anti-bacterial and anti-fungal substances.

In another illustrative embodiment, the surface layer 1 can comprise an active agent such as probiotica and/or silver, to minimize or prevent the formation of fungus, bacteria and/or parasites. One possible surface layer 1 comprising such an active agent is Vacuflex 18411AG, available from Omniflex, Inc. Such an active agent can be desirable in products such as mattresses and/or toppers, as discussed above.

According to another class of additive, the additive containing layer can also comprise pigments.

The use of a pigment as an additive can provide for a colored or patterned layer 1a, 1b (e.g., a colored and/or patterned surface layer) optionally in combination with a PCM which provides a colored or patterned foam products such as a mattress or topper. This can create an article with much more color variations than would be possible with simply using colored or pigmented gel. The use of pigmented PCM or other variations in the aesthetic of the substrate layer 1a, 1b can impart these aesthetics to the foamed product while at the same time providing an indication to the end consumer of the functionality of the PCM. In a preferred embodiment, the foamed product impregnated with PCM will equally have a blue/red appearance reflecting the heat regulating capacity of the foamed product.

According to another class of additive, the additive containing layer can also comprise the so-called polymeric micro-particles which are often used in personal care and pharmaceutical formulations to extend release of an active ingredient, to protect the active ingredient from decomposition in a composition, and/or to enable formulation of the active ingredient into a composition due to difficulties, such as solubility or formulation esthetics.

Polymeric micro-particle comprises discrete, free-flowing particles which can absorb, adsorb, entrap, or otherwise retain an active agent in a polymeric matrix. Such microparticles can provide a controlled release of the active agent over time either by rupture of the micro-particle, whereby the active agent is released when sufficient pressure or shearing action is applied to the micro-particle, or the micro-particle may be semi-permeable or porous which allows the active agent to diffuse from the particle. In some embodiments, the polymeric micro-particles themselves, without a loaded active agent, provide a desired benefit. Additionally, the micro-particle can deliver multiple active agents in addition to itself.

According to another class of additive, the additive containing layer can also comprise functionalized particles having as an active agent that can be either directly used or loaded onto particles include, but are not limited to: skin whiteners, anti-acne agents, antifungal agents, botanical extracts, minerals, plant extracts, concentrates of plant extracts (eg. aloe vera), emollients, moisturizers, skin soothing ingredients (eg. talc), colorants, perfumes, and the like. The quantities of such active agents present are sufficient to perform their intended function, without adversely affecting the properties or benefits of other ingredients present in the foamed product.

More preferred, such a functionalized additive can be one of, or a mixture of, a cosmetic compound, a medicinally active compound, a compound used in cosmetics or personal care, or any other compound that is useful upon topical application. Such topically active agents include, but are not limited to, skin-care compounds, plant extracts, antioxidants, insect repellants, counterirritants, vitamins, steroids, antibacterial compounds, antifungal compounds, anti-inflammatory compounds, sunscreens, optical brighteners, and other cosmetic and medicinal topically effective compounds.

Additive Composition:

(A) Carrier Component

The compositions from which the additive containing layers are formed comprise one or more additive dispersed in a carrier which comprises one or more liquid diluents. Suitable liquid diluents may be volatile or nonvolatile, and polar or non-polar. A variety of such carriers are known in the art and are generally known to comprise one or more compatible diluents, extenders and the like.

The type of carrier utilized in the present invention depends on the type of product desired. The compositions useful in the subject invention may be in a wide variety of product types including liquid or semi-liquid forms. These include, but are not limited to, lotions, creams, gels, sprays, ointments and pastes. Compositions useful in the invention may for example comprise a solution of materials having the additive dispersed therein, or may comprise an emulsion having the additive dispersed therein. The selection of carrier components and amounts depends on the desired product type and is within the level of ordinary skill.

The compositions will typically comprise from about 0.1% to about 35% additive and from about 5% to about 90% fluid carrier. The compositions generally comprise from about 5% to about 90% liquid diluent. The compositions will preferably have a viscosity of from about 10 to about 50,000 mPas at 10 sec$^{-1}$ (at 25° C., using 60 mm parallel plate with 0.5 mm gap at rate of 10 sec$^{-1}$).

These materials are well known in the art and are commercially available. Selection of the particular type and level of a given additive material for a particular purpose in a given product is within the skill of the artisan.

In yet another embodiment the composition is formulated as a cosmetic composition. As used hereinafter, the term "cosmetic composition" refers to a liquid or semi-liquid skin cosmetic which includes, but is not limited to lotions, creams, gels, pastes, and the like.

Compositions to be delivered using the present invention are preferably generally liquid in form. Any adjunct materials which are present may be liquid, solid or semi-solid at room temperature, though they should be selected so as to permit impregnation of the composition to form the additive containing layer 1.

For enhancing spraying, preferred compositions have a solids content of about 60 weight % or less. In this regard, "solids" refers to additive which are not soluble or miscible in the composition.

Highly preferred additives include tire retardants, thermoregulating additives such as PCM's; odor masking or neutralizing additives; FEBREZE®; perfumes; aromatic additives such as Camille, vanilla, eucalyptus; Ag nanoparticles: Au nanoparticles; etheric oils (aloe Vera); probiotics; anti-mosquito; iodium; magnesium; calcium; talc; anti-fungal additives; anti-algae additives; bactericides; bio ceramic fillers; hardeners; tea extracts (green tea); anti-dust mite additives; hydrophobic agents.

The functionalized additive can be applied to the latex foam substrate 1 via any suitable method. Non-limiting examples include direct application of the polymeric particle delivery system to the substrate by sprinkling, dusting, or spraying, for example. Preferred methods involve dispersing the additive in an aqueous or non-aqueous liquid or mixture of liquids, then applying the dispersion onto the substrate. The dispersion can be sprayed or coated, dipped, infused, or otherwise applied to the latex foam. Preferred are spraying techniques.

The method of making the foam in accordance with the present invention comprises impregnating the foam with an additive. Dispensing the additive can comprise pouring an amount (e.g., volume, weight and/or thickness) of gel precursor sufficient to penetrate the foam layer to a desired depth, which may vary depending upon the product and/or application.

For practical purposes, due to the weight of the functional additive, it can be useful to minimize the depth of penetration of the material into the foam while balancing the desired characteristics of the final product, e.g., breathe ability, softness, total weight, and the like. For example, for products such as mattress toppers, it can be desirable to minimize the overall weight of the topper. Therefore, tailoring the depth of penetration of the additive into the foam layer can provide the desired softness, while minimizing the contribution of the additive to the overall weight of the topper.

For example, it can be desirable for a mattress topper of 2 cm thickness to comprise a functional additive containing layer of about 0.1 mm to about 1 mm, and such a depth can be achieved by applying about 50 g/m$^2$ of additive to the upper surface of the foam layer, which defines the additive layer 1. Impregnating the additive into the foam layer 1 can be performed manually, or the process can be automated. For example, the additive can be disposed onto the foam layer 1 using a variety of techniques such as, but not limited to, a roller, pouring, spraying, vacuum techniques and/or the like.

The foam can comprise any natural or synthetic foam, both slab and molded. The foams are open cell. The foam may also comprise recycled foam, foam impregnated fiber mats or micro-cellular elastomer foam. Additionally the foam may include organic and/or inorganic fillers. Furthermore, additional additives may be incorporated into the foam composition, such as, but not limited to fire retardants, anti-fogging agents, ultraviolet absorbers, thermal stabilizers, pigments, colorants, odor control agents, perfumes and the like.

Figure 1B:
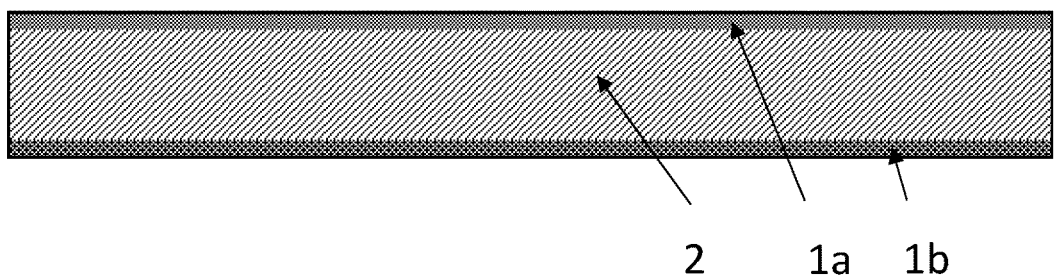

FIG. 1 shows a cross-sectional view of a section of one embodiment of an exemplary integral latex foam according to the present disclosure, comprising opposing upper and lower layers 1a, 1b. The integral latex foam comprising a first layer 1 and a second layer 2 and an additive containing foam layer 1 disposed adjacent to the foam layer 2.

In some embodiments, an optional material layer can be disposed in and/or between any of the foregoing layers, which can comprise color, text and/or graphics, indicia such as labels, embossing, and the like.

The present invention further concerns a kit in parts of a latex foam and an application kit comprising a solution, emulsion or dispersion of an additive to be applied on a surface of the foam layer. The additive is being selected from wherein the additive is selected from the group consisting of i) phase change material, ii) fire retardant, iii) an antimicrobial active agent, iv) an antifungal agent, v) a perfume and combinations comprising at least one of the foregoing.

Process:

The present invention concerns a process for manufacturing an integral latex foam as described above, the process comprising the steps of:
 a. pouring latex foam;
 b. vulcanizing the poured latex foam;
 c. impregnating the vulcanized latex foam with an additive in which the additive is applied in the form of a solution, emulsion or dispersion;
 d. and preferably drying the impregnated latex foam.

The impregnation is preferably achieved by a spraying technique.

A method for producing latex foam is the pouring of latex foam on an endless conveyor belt, followed by vulcanisation, washing and finally drying.

A second feature of the invention is represented by a plant for manufacture of latex foam products of unlimited length, envisaged to form mattresses, cushions and the like. The plant includes pouring means such as pouring, spraying techniques for latex foam material placed in a first and second and/or subsequent pouring stations, means for the laying of the latex foam material each provided with a laying plane of predetermined size or via a conveyer belt, one or more of a vulcanization station, operating means for the laying means, removing means of the vulcanized first layer to be placed in a second and/or subsequent pouring station.

Alternatively, different layers may be added to the latex foam of the present invention which are alternating layers existing of latex foam and foam selected from polyolefin, polyurethane, polystyrene or polyester or visco-elastic latex or mixtures thereof.

Latex foam inherently provides a greater independent support characteristic relative to foams such as polyurethane or urethane foams. This difference is attributable to the compositional differences between the materials and is reflected, at least in part, in the typical load deflection curves for each type of material. A load-deflection curve is typically a graph of the force in lbs. required to indent a flat disk of 50 sq. in. (8" diameter) into the foam or other material being tested for any given percentage of deflection.

Latex foam is typically characterized by having a more gradual slope in the lower portion of the curve, that is in the range of 5-10% deflection, which typically becomes steeper in the higher portion of the curve, that in the range of 50-70% of deflection.

Foams according to the present invention may contain perforations. Combinations of perforations having different sizes can also be used. Sizes of the perforations are between 0.5 and 2 cm. The perforations when combined with the composite foam of the present invention gives the user of the composite foam a higher degree of comfort. Foams according to the present invention may contain profiles. The profiles when combined with the composite foams of the present invention present in specific zones at the upper side of the upper layer of composite foam enhance the sleeping comfort of the user, because the bedding when formulated with the composite foam of the present invention feels softer in said zones, depending on the shape and the dimensions of said profiles.

The foam of the present invention may also be compounded with further layers in addition to the latex foam. Different layers may be added which are alternating layers existing of latex foam and foam selected from polyolefin, polyurethane, polystyrene or polyester or visco-elastic latex or mixtures thereof.

Example 1

A to F

A liquid latex foam layer is made. The latex foam mixture can consist of natural latex or synthetic latex, like Intex 2720 or Intex 2731 (commercially available from Polimeri Europa) or any other available foam latex or mixture. The top surface of the latex foam can be profiled in different zones during the curing process of the latex foam. The foam follows the entire process on the continuous production installation through the different steps: preheating, vulcanising, washing, pressing, drying. Before the drying step, the foam layer is impregnated (on the top surface, the bottom surface and/or side surfaces and combinations thereof) with one or more of an additive selected from (A) PCM such as, Mikrathermic G Soft (loaded at 50-450 g/m$^2$); Mikracat B; Mikra EF; Mikrafix; (B) colorant such as Helizarin® blue RT (concentration 1 g/1000 l to 100 g/1000 l); (C) perfume; (D) Fire retardant such as Finifire Pro® (loaded at 600 g/m$^2$); (E) Antifungal agent; (F) Bacteriocides.

Finally the foam product (mattress topper) is cut to length and width, and can be produced in sheets or rolls. The foam exhibits excellent performance of the additives, while the foam characteristics are not adversely affected and uniformity of the foam cell structure has been maintained (SEM analysis).

The foam of the present invention can be used in numerous other applications. Main sectors of application are bedding industry.

It will be appreciated that each specific application puts its own demands on the beddings to be used. Important characteristics in this connection are density, hardness, resilience and dampening behavior of the bedding and in order to fit each application, these characteristics should be optimally balanced and adjusted.

The present latex foam provide an antimicrobial/anti-odor feature, which is beneficial in applications in sports equipment, furniture and mattress pads; and the present foams provide a substantially waterproof surface that cane be very useful in, for example, products where incontinence is an issue (e.g., mattress pads, wheelchair pads, and the like).

Other suitable applications are those where heat energy management is required. Additionally, the foam of the present invention may include organic and/or inorganic fillers. Furthermore, additional additives may be incorporated into the inner structure of the foam such as but not limited to flame retardants, anti-fogging agents, ultraviolet absorbers, thermal stabilizers, pigments, colorants, odor control agents, and the like.

In another embodiment of the present invention, customizing the foam, for its use as a bedding can be done by a potential user who completes a questionnaire to aid in the analysis of that user's "sleep functionalities" profile. The sleep-comfort profile assesses such functionalities as the user's preference to functionalities such as intensity and selection of active agents including perfume, lotions and the like. A firmness recommendation is computed either in terms of a pressure for various zones of a "test mattress" containing an air bladder or in terms of a foam type and density for each zone. In addition, a surface recommendation is established based on the user's responses to a surface recommendation questionnaire and the foams of the present invention are then tailored according to the consumer needs.

In yet another embodiment, the first layer can be defined as a side surface of the mattress or mattress topper, i.e. the sides perpendicular to the supporting surface of the mattress. According to the present invention both the four side surfaces and/or the upper and/or bottom surfaces of the mattress or mattress topper can be impregnated with an additive.

Figure 1C:
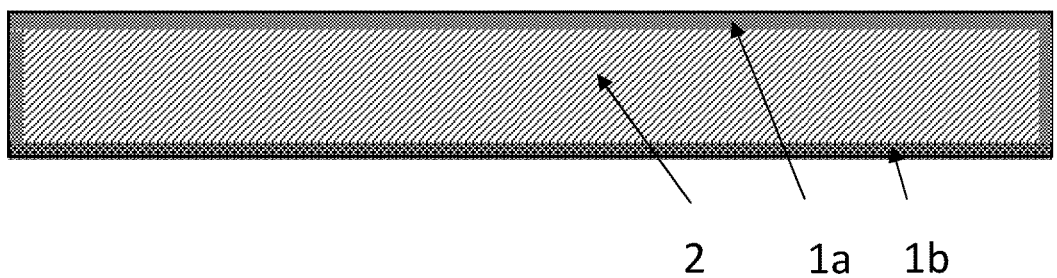

In a preferred embodiment whereby the core of the foam is substantially free of the additive, it is clear by core is defined as the part of the integral foam structure at a distance of 9 mm of the outer surface of said foam structure when measured perpendicularly to the outer surface and as represented in FIG. 1c with reference number 2.

The invention claimed is:

1. A single integral slab or mold of latex foam comprising a first layer of latex foam and a second and/or subsequent layer of latex foam characterized in that said first layer is impregnated with an additive that is applied in the form of a solution, emulsion or dispersion onto said first layer during a post-vulcanization step and whereby the first layer has a thickness from 0.01 to 9 mm.

2. The single integral slab or mold of latex foam according to claim 1, wherein the second and/or subsequent layer of said foam is free of said additive.

3. The single integral slab or mold of latex foam according to claim 1, comprising a third layer containing an additive in which the additive is applied in the form of a solution, emulsion or dispersion and whereby the third layer has a thickness from 0.01 to 9 mm.

4. The single integral slab or mold of latex foam according to claim 3, wherein said first layer and/or third layer is colored.

5. The single integral slab or mold of latex foam according to claim 1, wherein the additive is selected from the group consisting of i) phase change material, ii) fire retardant, iii) an antimicrobial active agent, iv) an antifungal agent, and combinations comprising at least one of the foregoing.

6. The single integral slab or mold of latex foam according to claim 5, wherein said first layer and/or subsequent layer is colored.

7. The single integral slab or mold of latex foam according to claim 1, wherein the additive is a phase change material.

8. The single integral slab or mold of latex foam according to claim 1, wherein the impregnation is achieved by a spraying technique.

9. A process for manufacturing a single integral slab or mold of latex foam as identified in claim 1, the process comprising the steps of:
   a. pouring latex foam;
   b. vulcanizing the poured latex foam; and
   c. dosing an additive to the vulcanized latex foam in which the additive is dosed in the form of a solution, emulsion or dispersion.

10. A bedding product comprising a single integral slab or mold of latex foam having a first layer of latex foam and a second and/or subsequent layer of latex foam characterized in that said first layer is impregnated with an additive that is applied in the form of a solution, emulsion or dispersion onto said first layer during a post-vulcanization step and whereby the first layer has a thickness from 0.01 to 9 mm.

11. The bedding product according to claim 10, wherein said product is a mattress topper.

12. The bedding product according to claim 11, wherein said mattress topper has a thickness of from 2 to 20 cm.

13. The process according to claim 12, wherein the dosing is achieved by a spraying technique.

14. A kit in parts of a vulcanized latex foam and an application kit comprising a solution, emulsion or dispersion of an additive to be applied on a surface of the foam layer.

15. The kit in parts according to claim 14, wherein the additive is selected from the group consisting of i) phase change material, ii) fire retardant, iii) an antimicrobial active agent, iv) an antifungal agent, v) a perfume and combinations comprising at least one of the foregoing.

* * * * *